Aug. 26, 1958
J. RABINOW ET AL
2,849,197
SERVO CONTROL MECHANISM
Filed July 10, 1952
4 Sheets-Sheet 1
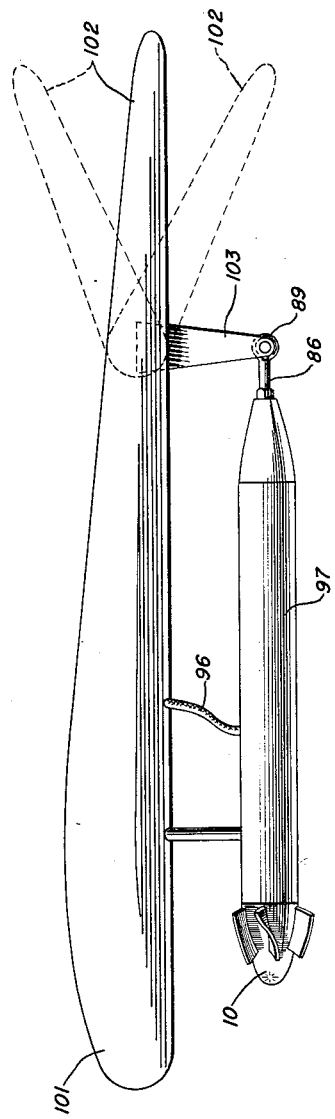
FIG. I
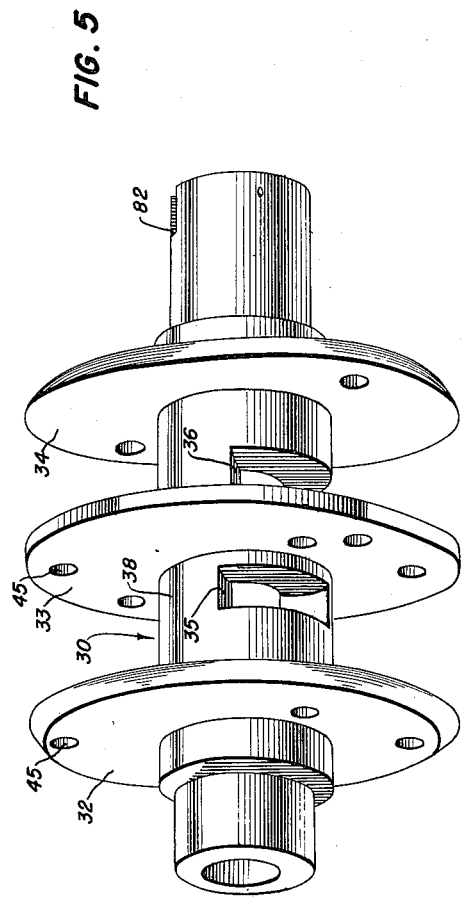
FIG. 5
INVENTORS
JACOB RABINOW
EMMETT C. BAILEY
FRANCIS H. SHEPARD Jr.
BY
ATTORNEYS

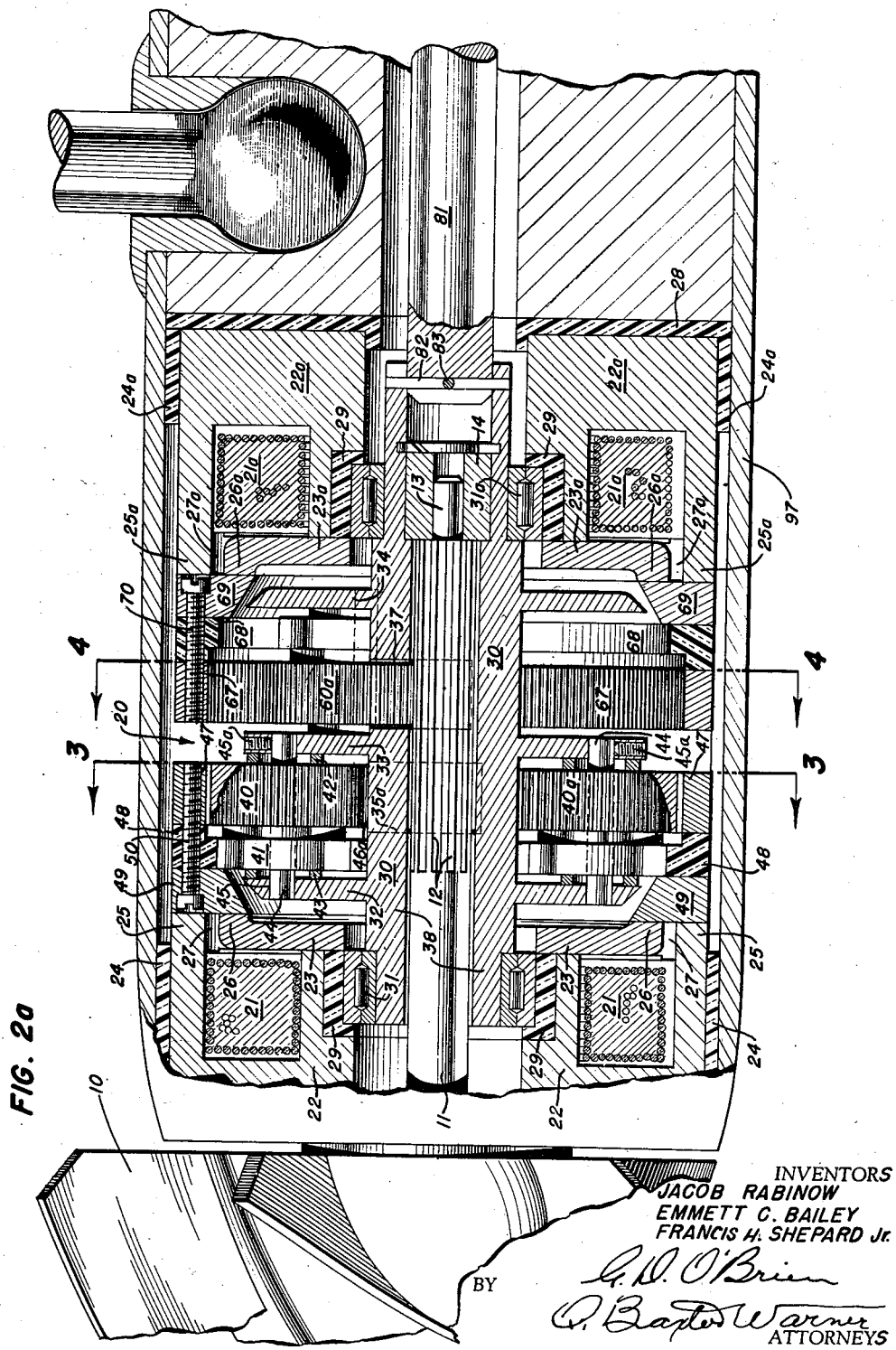

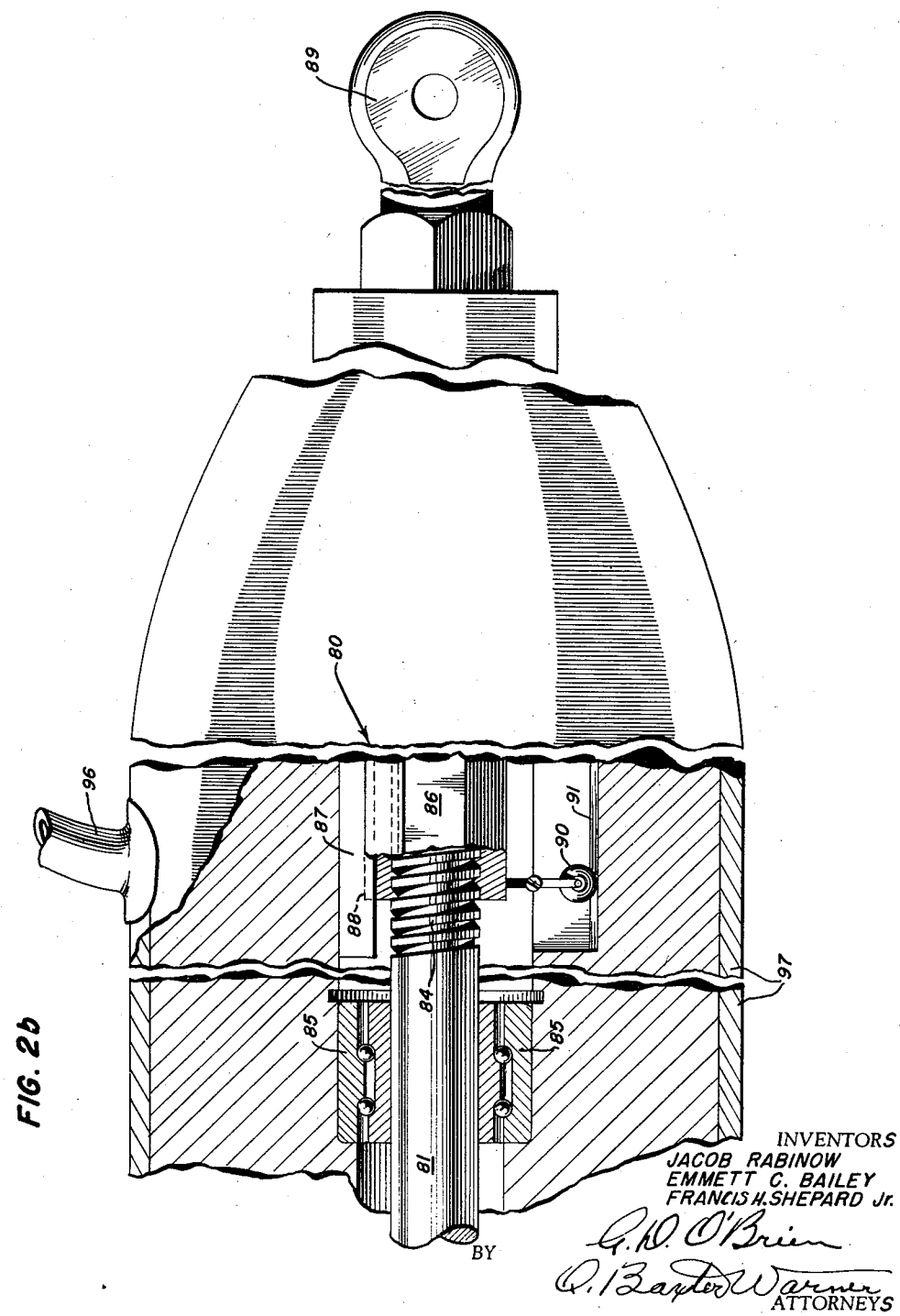

Aug. 26, 1958

J. RABINOW ET AL 2,849,197

SERVO CONTROL MECHANISM

Filed July 10, 1952

INVENTORS
JACOB RABINOW
EMMETT C. BAILEY
FRANCIS H. SHEPARD Jr.

BY

ATTORNEYS

United States Patent Office 2,849,197
Patented Aug. 26, 1958

2,849,197

SERVO CONTROL MECHANISM

Jacob Rabinow, Takoma Park, Md., Emmett C. Bailey, Riverside, Calif., and Francis H. Shepard, Jr., Summit, N. J., assignors to the United States of America as represented by the Secretary of the Navy Application July 10, 1952, Serial No. 298,076

5 Claims. (Cl. 244—14)

The present invention relates generally to a servo control mechanism, and more particularly to an air powered servo control mechanism particularly adapted for use in aircraft and guided missiles.

In directing the flight of aircraft and guided missiles it is necessary to position flight course control elements such as ailerons, elevons, rudders, flaps, and the like in accordance with the flight path or changes in flight path desired. Although it is possible to position the flight course control elements by direct mechanical linkages to a central control station, the linkages required become cumbersome and the system becomes unwieldy. It is therefore preferred in the art to employ servo control mechanisms associated directly with each flight course control element and operated remotely by electrical signals issuing from the central control station. The command signals for causing electrical signals to issue from the central control station may be initiated at the original launching site or at any other point remote from the missile.

The present invention pertains to a servo control mechanism of this type, which utilizes the air slip of the craft or missile to power a windmill, air motor, or air turbine as the servo motor or prime mover for positioning the course control elements as desired by the central control station. Since it is generally necessary to move the various course control elements in one of two directions, a reversing clutch is associated with the air motor in the present servo control mechanism to derive from the unidirectional motor two directions of movement. The power from the motor as controlled by the reversing clutch is applied to an actuator in turn coupled to a course control element to move and position the element in one of the two directions as desired. In the preferred embodiment of the present invention, clutch operation is had between three conditions, one condition providing power transmission in one direction, the second condition providing power transmission in the opposite direction, and the third condition being neutral wherein motor power is not transmitted to the actuator. In obtaining the above three-way action, it is preferred to employ a magnetic control over the clutch appropriately responsive to signals issuing from the central flight control station. Also, there is associated with the actuator an electrical follow-up signal means operated thereby to indicate to the central control station the position of the actuator and hence of the course control element, to enable comparison of the actual position of the course control element with that required by the central flight control station. The signals issuing from the central control station therefore operate the clutch magnets to effect movement of the course control element in one direction or the other as required, until the follow-up signal controlled by the actuator indicates that the course control element is in the required position; whereupon the clutch is placed in its aforementioned neutral condition so that no more energy is transmitted from the motor to the actuator.

It is therefore one object of the present invention to provide a windmill or air motor powered servo mechanism.

Another object of the present invention is to provide a windmill or air motor powered servo mechanism utilizing an electromagnetic clutch, for selecting two directions of actuation from the unidirectional motor in response to an electrical control signal.

Another object of the present invention is to provide a low inertia reversing magnetic clutch.

Another object of the present invention is to provide a low inertia magnetic clutch operating in response to a continuous unidirectional input drive to supply three output conditions: two directions of output drive and a neutral or zero output condition.

Other objects and many of the attendant advantages of this invention will be readily appreciated as the same becomes better understood by reference to the following detailed description when considered in connection with the accompanying drawings wherein:

Fig. 1 is an end view of a wing of an aircraft or missile having an air powered servo mechanism exemplary of the present invention mounted thereunder;

Fig. 2a is an enlarged view of the forward portion of an air powered servo mechanism exemplary of the present invention, shown partially in longitudinal section;

Fig. 2b is an enlarged view of the after portion of the servo mechanism illustrated in Fig. 2a, shown partially in longitudinal section;

Fig. 5 is an isometric view of a spider employed in the magnetic clutch illustrated in Fig. 2a.

Figure 4:
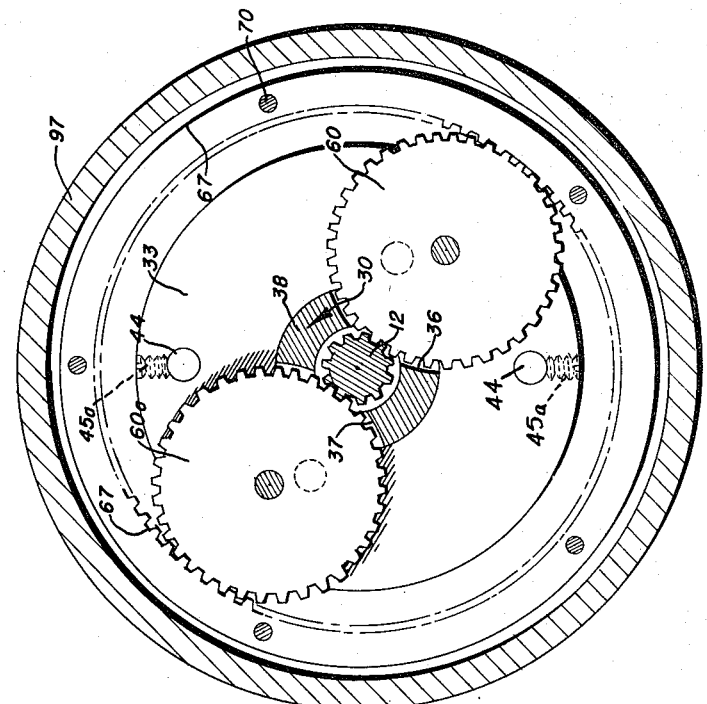
Fig. 4 is a cross-sectional view of the mechanism shown in Fig. 2a, taken along line 4—4 thereof.

Referring particularly to the partially longitudinally sectioned view of the servo control mechanism embodiment of the present invention illustrated in Figs. 2a and 2b, the device comprises three primary sections: the windmill or air turbine 10, the magnetic clutch 20, and the actuator 80. Windmill 10 is mounted for axial rotation relative to the major housing 97 and is connected to rotatable drive shaft 11, which terminates in a reduced diameter stub shaft 13 supported in the annular friction bearing 14. As shown in the drawing, the rearward portion of shaft 11 is splined longitudinally at 12 to provide a gear drive for the magnetic clutch assembly described below.

Annularly disposed about the shaft 11 and located at each end thereof are two substantially identical electromagnet assemblies, shown as comprising the annular coils 21 and 21a housed within the annular main body members 22 and 22a and the supplemental annular body members 23 and 23a. The magnet body members are formed from temporary magnetic material, such as soft iron, and the portions 25 and 26 of one magnet and 25a and 26a of the other magnet provide annular pole pieces therefor separated by the annular air gaps 27 and 27a respectively. In order to fully insulate the housing 97 and other portions of the mechanism from the effects of the magnets when energized, the magnet body members may be spaced therefrom by nonpermeable elements such as rings 24 and 24a, annular cap 28, and bearing caps 29.

Figure 3:
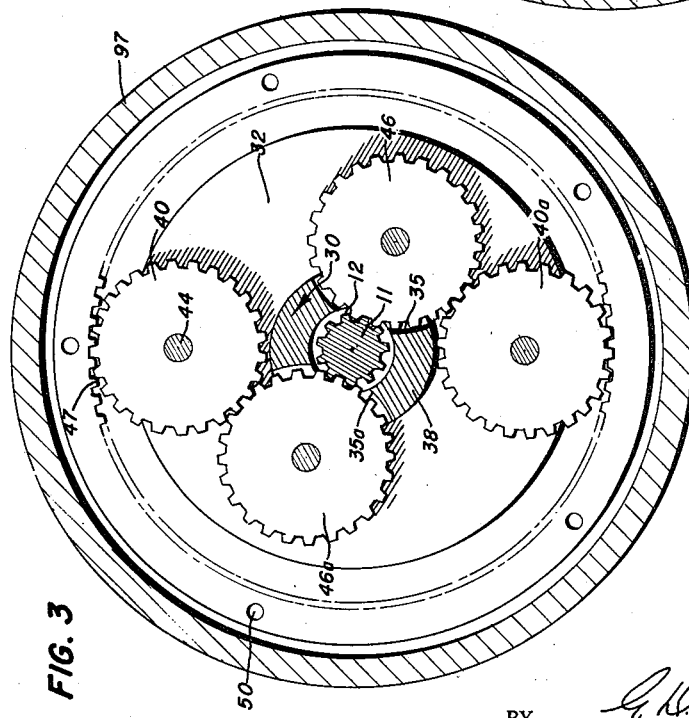
Fig. 3 is a cross-sectional view of the mechanism shown in Fig. 2a, taken along line 3—3 thereof.

Supported between the electromagnet assemblies on the bearings 31 and 31a, and surrounding a portion of the drive shaft 11, is the remainder of the magnetic clutch assembly. The hub of this assembly is spider 30, which is shown separately in Fig. 5 as comprising a substantially tubular central portion 38 having spaced radial disks 32, 33, and 34 affixed thereto. As can be seen in Figs. 3 and 4, the central tubular section 38 is provided with opposed openings 35, 35a and 36, 37.

Carried by the spider are two sets of planetary gear systems, one supported between disks 32 and 33 and the other supported between disks 33 and 34. The gear system supported between disks 32 and 33 is best shown in the cross-sectional view, Fig. 3, where it is seen that two idler gears 46 and 46a mesh with the splined portion 12 of drive shaft 11 through the cutout sections 35 and 35a in the central cylindrical portion 38 of the spider. And these gears respectively mesh with gears 40a and 40, which in turn mesh with the teeth of an internal ring gear 47. Considering the details of the individual assemblies of gears 40, 40a, reference is had to that for gear 40 as exemplary of the other. Gear 40 which meshes with the ring gear 47 carries therewith a pitch diameter roller 41, and this unit is rotatably carried between the disks 32 and 33 of the spider upon a stub shaft 44 which enters holes 45 (Figs. 2a and 5) in these disks and is fixed therein by any suitable expedient, such as setscrew 45a. The gear 40 and its associated pitch diameter roller are spaced from the disks 32 and 33 by the thrust rings 42 and 43. The other gears 46 and 46a are also rotatably mounted between the disks 32 and 33 of the spider. Surrounding this gear assembly is the previously mentioned ring gear 47, and affixed thereto by means of screws 50, or the like, is an annular ring 49 of temporary magnetic material which is positioned adjacent the pole pieces 25 and 26 of the magnet 21, 22, 23. Magnetically insulating the ring gear 47 from the magnetically permeable annulus 49 is the annular spacer 48 of nonmagnetic material, also providing a pitch diameter bearing for roller 41.

From the above structural description had with reference to Figs. 2a, 3, and 5, it can be seen that the instant planetary gear arrangement operates in conjunction with the temporary magnet 21, 22, 23 as follows: When the aforementioned magnet is not energized the magnetically permeable annulus 49 is not attracted to the pole pieces thereof and hence it, along with the magnetically insulating spacer 48 and ring gear 47 associated therewith, are free to rotate relative to the magnet. Hence, when shaft 11 is rotated by its driving windmill or air motor 10, it causes idler gears 46 and 46a, which mesh with the splined portion 12 of the drive shaft 11, to rotate about their respective axes to in turn similarly rotate gears 40 and 40a. Since ring gear 47 is now free to travel about the gears 40, 40a, 46 and 46a in response to rotation of these planetary gears, the planetary gears remain stationary in their orbits. However, upon energization of the magnet 21, 22, 23, the magnetically permeable annulus 49 is attracted to the pole pieces 25, 26 and is there held against rotation, conseqeuntly stopping the travel of ring gear 47. Under this condition the planetary gears 40, 40a, 46, and 46a are compelled to travel in their orbits around the ring gear 47 and about the drive shaft 11, consequently rotating the spider 30 upon which the axes of the planetary gears are carried.

Referring next to the gear assembly located between annular disks 33 and 34 of the spider with particular reference to Figs. 2a and 4, it will be seen that this system comprises two planetary gears 60 and 60a meshing both with the splined section 12 of drive shaft 11, through the openings 36 and 37 in the central portion 38 of the spider, and with the teeth of the internal ring gear 67. The construction of this gear assembly is substantially identical to that described for the other gear assembly with the exception of the omission of idler planetary gears. The ring gear assembly comprising the ring gear 67, the magnetically insulating spacer 68, and the magnetically permeable annulus 69, all affixed together as by screws 70, is also substantially identical to that described above. It may be thus seen that when shaft 11 is driven by its windmill 10, and when the magnet 21a, 22a, 23a is not energized, rotation of gears 60 and 60a causes ring gear 67 to rotate relative to the magnet and to travel about the planetary gears 60 and 60a. However, when this magnet is energized, rotation of ring gear 67 is stopped and the planetary gears 60 and 60a are caused to orbit about the drive shaft or sun gear 11 carrying therewith the spider 30 upon which they are mounted.

Since idler gears 46 and 46a are interposed in the first described planetary gear assembly and are omitted in the second described assembly, it is apparent that when ring gears 47 and 67 are both free to rotate relative to their respective magnets in response to rotation of drive shaft 11, they rotate in opposite directions; and similarly the orbital motions of the planetary gears of the two assemblies are in opposite directions when their respective ring gears are fixed against rotation by energization of their respective magnets. Hence, when neither of the two magnets is energized the spider 30 remains stationary; when magnet 21, 22, 23 is energized and magnet 21a, 22a, 23a is not energized, spider 30 rotates upon its bearings 31, 31a in one direction; and when magnet 21a, 22a, 23a is energized with magnet 21, 22, 23 not energized, the spider 30 rotates upon its bearings 31, 31a in the opposite direction.

Actuator shaft 81, shown in Figs. 2a and 2b, which is threaded at 84 is fixed to spider 30 by means of key 82 and pin 83 for rotation therewith upon bearing 85. Internally threaded traveler shaft or nut 86 is threaded upon actuator shaft 81 and fixed against rotation by the entrance of key 87 into groove 88 formed in the traveler shaft. If desired, a low friction ball bearing return type screw drive may be employed by the actuator and traveler shafts. Thus, upon rotation of spider 30 actuator shaft 81 is rotated therewith, and shaft or nut 86 threaded onto the actuator shaft 81 is caused to travel axially along actuator shaft 81 in one direction or the other depending upon the direction of rotation of the spider 30 and actuator shaft 81. Traveler shaft 86 which terminates in eye 89 may be affixed to a clevis or crank 103, as shown in Fig. 1, to position an elevon, aileron, elevator, or the like 102 when this servo control mechanism is mounted upon the undersurface of a guided missile or aircraft wing 101, as through the ball and socket joint 94. Affixed to and shown in Fig. 2b as depending from traveler shaft 86 is an electrical roller contact 90 which traverses a potentiometer slide wire 91 as shaft 86 is moved. This variable potentiometer is used for the purpose indicated above of providing an electrical signal indicative of actual traveler shaft or course control element position, and the signal thus derived is fed back to the central control station to enable a comparison between course control element position desired and that actually had. All electrical connections between the missile or aircraft and the instant servo control mechanism, as may be necessary to effect operation of the electromagnets and of the instant position follow-up potentiometer, may be had through the cable 96.

In operation of the servo control mechanism described herein above, it is contemplated that it be mounted in the air slip of the missile or aircraft, as for example on the undersurface of a wing, from which the windmill or air turbine 10 derives the operating power. This power is transmitted from the windmill through the drive shaft 11 and spider 30 to the actuator shaft 81, which latter is in turn coupled to the traveler shaft 86 to move the same axially in one of two directions as required by the central control station. The proper positioning of the traveler shaft 86 is effected through the magnetic clutches associated with the spider 30 operating in response to signals derived from the central control station to control the transmission of power from the drive shaft 11 to drive the traveler shaft 86 in the direction required, or to decouple the drive shaft from the spider and hence the traveler shaft leaving the spider and traveler shaft in the positions which they then occupy. In order to inform the central control station of the position actually occupied by the traveler shaft 86 so that this position may be compared by the central control station with that required, a variable potentiometer is associated with the traveler shaft whose output to the central control station is varied in accordance with the position occupied by this shaft.

The above-described specific embodiment of the present invention is presented merely by way of example to facilitate a clear understanding of the invention. Obviously many modifications and variations of the present invention are possible in the light of the above teachings. It is therefore to be understood that within the scope of the appended claims the invention may be practiced otherwise than as specifically described.

What is claimed is:

1. An aerodynamically streamlined air powered servo unit adapted to be mounted on an airborne body having directional control members, said unit comprising a casing, an air turbine rotatably mounted on one end of said casing, a traveler shaft operatively connected to said air turbine and keyed to said casing for axial movement therein, transmission means including a clutch mechanism linking said turbine with said traveler shaft, means carried by said transmission means in threaded engagement with said traveler for imparting said axial movement to said traveler shaft in response to the operation of the clutch means, a link member connected to said traveler shaft and the control members for actuating said control members of the airborne body in response to said axial movement of said traveler shaft, a slide wire carried by and disposed within said casing, and electrical contact means carried by said traveler shaft in engagement with and cooperating with said slide wire for providing an electrical signal indicative of said axial movement of the traveler shaft thereby to determine the position of the control means.

2. An air powered aerodynamically streamlined servo mechanism comprising a casing, an air turbine rotatably mounted on one end of the mechanism and providing an unidirectional prime mover, a transmission operatively connected to said air turbine for deriving two directions of movement from the unidirectional prime mover, magnetic clutch devices cooperating with said transmission for selectively effecting power transmission in either one of said two directions of movement in response to energization of the clutch devices and rendered ineffective to transmit said power upon de-energization of the clutch devices, an actuated element reciprocable at the other end of the mechanism, mechanical actuator means keyed to said casing and linked to said transmission for sliding movement within said casing in response to operation of said transmission, means connected to said transmission in threaded engagement with said actuator, means for moving said actuator means slidably within said casing, means mechanically linked to said element and the actuator means to reciprocate the element in response to sliding movement of said actuator means, a slide wire disposed within said casing and extending axially along and within said casing, and an electrical contact roller carried by said actuator means in engagement with and cooperating with said slide wire for providing an electrical signal indicative of said sliding movement of the actuator means thereby to determine the movement of the actuated element.

3. In a guided missile responsive to a control signal for controlling its course, a guidance system comprising a series of course deflecting elements, actuating means comprising a wind driven rotor operatively connected to said actuating means, means including a normally disengaged magnetic clutch carried by said actuating means, for translating the energy of the rotor to the actuating means in response to operation of said clutch, a traveler shaft operatively connected to said actuating means and controlled thereby, threaded means on said actuating means in engagement with complementary means on said traveler shaft for imparting longitudinal movement to said shaft, a slide wire disposed adjacent one end of the traveler shaft, an electrical contact element carried by the traveler shaft in engagement with and cooperating with said slide wire for providing an electrical signal indicative of the longitudinal movement of the traveler shaft, and an electrical signal responsive means cooperating with said clutch for maintaining said clutch engaged throughout the period of electrical signal transmission, and means controlled by said movement of the traveler shaft for operating said deflecting elements.

4. An aerodynamically streamlined air powered servo unit adapted to be mounted on an airborne body having a directional control member, and comprising a casing, an air turbine rotatably mounted on one end of said casing, a shaft connected to and driven by said turbine, a traveler shaft mounted within said casing at the other end thereof and operatively connected to said driven shaft and keyed to said casing for sliding movement, transmission means including a magnetic clutch mechanism connecting said turbine and the driven shaft with said traveler shaft, means including a threaded portion on said traveler shaft and cooperating with complementary threaded means carried by and operatively connected to said transmission means for moving said traveler shaft axially within said casing in response to the operation of said clutch means, a link pivotally connected to said traveler shaft and attached to said control member for imparting reciprocating movement to said member in response to said axial movement of the traveler shaft, an electrical roller contact disposed within said casing and carried by and movable with said traveler shaft, and a slide wire potentiometer disposed within said casing in engagement with said roller for providing an electrical signal indicative of said movement of the traveler shaft thereby to determine the position of said control element.

5. An aerodynamically streamlined air powered servo unit adapted to be mounted on an airborne body having a directional control member for stabilizing the body and comprising a casing, an air turbine rotatably mounted on the forward end of said casing, a traveler shaft keyed and slidably mounted within said casing at the rear end thereof, transmission means including a clutch mechanism linking said turbine with said traveler shaft, said last-named means further including a threaded bore in one end of said traveler shaft for causing said traveler shaft to move axially in response to the operation of said transmission means and clutch mechanism, a potentiometer slide wire disposed within said casing adjacent said traveler shaft, means including an electrical roller contact carried by said traveler shaft for providing an electrical signal indicative of the axial movement of said traveler shaft thereby to determine the position of said directional control member, and a link pivotally mounted on one end of the traveler shaft and operatively connected to said member for imparting reciprocating movement to said control member in response to said axial movement of the traveler shaft.

References Cited in the file of this patent

UNITED STATES PATENTS

| 593,652 | Hardingham | Nov. 16, 1897 |
| 848,244 | Horstmann | Mar. 26, 1907 |
| 1,368,226 | Sperry | Feb. 8, 1921 |
| 1,418,335 | Sperry | June 6, 1922 |
| 1,818,708 | Hammond | Aug. 11, 1931 |
| 1,897,285 | Veit | Feb. 14, 1933 |
| 1,918,082 | Carlson | July 11, 1933 |
| 2,603,434 | Merrill | July 15, 1952 |
| 2,626,115 | Atwood | Jan. 20, 1953 |
| 2,662,402 | Ince | Dec. 15, 1953 |

FOREIGN PATENTS

| 461,715 | Great Britain | Mar. 16, 1938 |
| 500,334 | Great Britain | Feb. 7, 1939 |
| 607,963 | Great Britain | Sept. 8, 1948 |